(12) United States Patent
Kim et al.

(10) Patent No.: US 11,136,449 B2
(45) Date of Patent: Oct. 5, 2021

(54) THERMOPLASTIC RESIN COMPOSITION

(71) Applicant: LOTTE ADVANCED MATERIALS CO., LTD., Yeosu-si (KR)

(72) Inventors: Gi Sun Kim, Uiwang-si (KR); Seon Ae Lee, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 184 days.

(21) Appl. No.: 16/473,058

(22) PCT Filed: Dec. 20, 2017

(86) PCT No.: PCT/KR2017/015150
§ 371 (c)(1),
(2) Date: Jun. 24, 2019

(87) PCT Pub. No.: WO2018/124614
PCT Pub. Date: Jul. 5, 2018

(65) Prior Publication Data
US 2019/0330461 A1    Oct. 31, 2019

(30) Foreign Application Priority Data

Dec. 30, 2016 (KR) .................. 10-2016-0184168
Nov. 10, 2017 (KR) .................. 10-2017-0149823

(51) Int. Cl.
| | | |
|---|---|---|
| C08L 25/12 | (2006.01) | |
| C08K 3/22 | (2006.01) | |
| C08L 25/16 | (2006.01) | |

(52) U.S. Cl.
CPC ............ C08L 25/12 (2013.01); C08L 25/16 (2013.01); *C08K 2003/2296* (2013.01); *C08L 2201/08* (2013.01); *C08L 2205/025* (2013.01); *C08L 2205/03* (2013.01)

(58) Field of Classification Search
CPC .. C08L 25/12; C08L 25/16; C08K 2003/2296
See application file for complete search history.

(56) References Cited

U.S. PATENT DOCUMENTS 5,906,679 A * 5/1999 Watanabe ............ C01G 30/02
106/286.6
9,902,850 B2    2/2018 Kim et al.

FOREIGN PATENT DOCUMENTS

| | | |
|---|---|---|
| JP | 11-035787 A | 2/1999 |
| JP | 11-263705 A | 9/1999 |
| JP | 2006-124588 A | 5/2006 |
| KR | 20030005981 A * | 1/2003 |
| KR | 10-0903675 B1 | 6/2009 |
| KR | 10-2014-0068672 A | 6/2014 |
| KR | 10-2016-0001572 A | 1/2016 |
| KR | 10-2016-0067675 A | 6/2016 |
| WO | 2018/124614 A1 | 7/2018 |

OTHER PUBLICATIONS

Machine translation of KR 10-2003-0005981 A, published Jan. 23, 2003.*
Prasanna et al., "Insight into the Mechanism of Antibacterial Activity of ZnO: Surface Defects Mediated Reactive Oxygen Species Even in the Dark", Langmuir 2015, vol. 31, pp. 9155-9162 (Jul. 29, 2015).
International Search Report in counterpart International Application No. PCT/KR2017/015150 dated Mar. 30, 2018, pp. 1-4.

* cited by examiner

*Primary Examiner* — Vickey Nerangis
(74) *Attorney, Agent, or Firm* — Additon, Pendleton & Witherspoon, P.A.

(57) ABSTRACT

A thermoplastic resin composition of the present invention comprises: (A) 100 parts by weight of a thermoplastic resin comprising (A1) a rubber-modified aromatic vinyl-based graft copolymer, (A2) an aromatic vinyl-based copolymer resin having a flow index of about 5 g/10 min to about 8 g/10 min as measured by the ASTM D 1238 standard, and (A3) an α-methylstyrene copolymer; and (B) about 0.1 to about 10 parts by weight of zinc oxide, wherein the zinc oxide has a size ratio (B/A) of peak A in the region of 370 nm to 390 nm to peak B in the region of 450 nm to 600 nm of about 0.01 to about 1 in photoluminescence measurement, and has a BET surface area of about 10 m²/g or less as measured by a BET analyzer.

12 Claims, No Drawings

THERMOPLASTIC RESIN COMPOSITION

CROSS-REFERENCE TO RELATED APPLICATIONS

This application claims priority to and the benefit of International Application No. PCT/KR2017/015150, filed Dec. 20, 2017, which published as WO 2018/124614 on Jul. 5, 2018; Korean Patent Application No. 10-2016-0184168, filed in the Korean Intellectual Property Office on Dec. 30, 2016; and Korean Patent Application No. 10-2017-0149823, filed in the Korean Intellectual Property Office on Nov. 10, 2017, the entire disclosure of each of which is incorporated herein by reference.

TECHNICAL FIELD

The present invention relates to a thermoplastic resin composition. More particularly, the present invention relates to a thermoplastic resin composition that exhibits good balance between low odor, impact strength, creep resistance, fluidity, heat resistance, and antibacterial properties.

BACKGROUND ART

As a thermoplastic resin, a rubber-modified aromatic vinyl copolymer resin such as an acrylonitrile-butadiene-styrene copolymer resin (ABS resin) has good properties in terms of mechanical properties, processability, external appearance, and the like, and is broadly used as interior/exterior materials for electric/electronic products, automobiles, buildings, and the like.

In particular, despite low manufacturing costs and good moldability to be used as 3D printing materials, the rubber-modified aromatic vinyl copolymer resin has a disadvantage of generating a strong plastic odor during or after molding due to generation of an excess of out-gas (unreacted volatile organic compounds).

Moreover, when such resins are used for applications entailing physical contact with the body, such as medical equipment, toys, food containers, and the like, the resins are required to have antibacterial properties. In particular, in application to materials for OA, it is important for the resins to have creep resistance together with antibacterial properties and low odor.

Conventionally, hydrogenation has been proposed to achieve a deodorant effect. However, this method is difficult to apply to an actual process and requires additional facility costs due to difficulty in application to existing process facilities.

In addition, although an aromatic vinyl copolymer having a high molecular weight may be used in order to improve creep resistance of the resin, this method has a problem of deterioration in fluidity.

Therefore, there is a need for a thermoplastic resin composition that exhibits good balance between low odor, impact strength, creep resistance, heat resistance, fluidity, and antibacterial properties.

The background technique of the present invention is disclosed in Korean Patent Laid-open Publication No. 2016-0001572 and the like.

DISCLOSURE

Technical Problem

It is an object of the present invention to provide a thermoplastic resin composition exhibiting good balance between low odor, impact strength, creep resistance, heat resistance, fluidity, and antibacterial properties.

It is another object of the present invention to provide a thermoplastic resin composition exhibiting good flame retardancy without using a separate flame retardant.

The above and other objects of the present invention can be achieved by the present invention described below.

Technical Solution

One aspect of the present invention relates to a thermoplastic resin composition. The thermoplastic resin composition may include: 100 parts by weight of (A) a thermoplastic resin including (A1) a rubber-modified aromatic vinyl graft copolymer; (A2) an aromatic vinyl copolymer resin having a melt index (MI) of about 5 g/10 min to about 8 g/10 min, as measured in accordance with ASTM D 1238; and (A3) an α-methylstyrene copolymer; about 0.1 parts by weight to about 10 parts by weight of (B) zinc oxide, wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement and a BET surface area of about 10 m$^2$/g or less, as measured using a BET analyzer.

In one embodiment, the (A2) aromatic vinyl copolymer resin may have a weight average molecular weight of about 85,000 g/mol to about 150,000 g/mol.

In one embodiment, the (A3) α-methylstyrene copolymer may be a copolymer of about 65 wt % to about 80 wt % of α-methylstyrene and about 20 wt % to about 35 wt % of acrylonitrile.

In one embodiment, the (A3) α-methylstyrene copolymer may have a weight average molecular weight of about 130,000 g/mol to about 180,000 g/mol.

In one embodiment, the thermoplastic resin composition may satisfy the following Relation 1.

$$M_{A2} < M_{A3}, \quad \text{[Relation 1]}$$

where $M_{A2}$ is the weight average molecular weight of the (A2) aromatic vinyl copolymer resin and $M_{A3}$ is the weight average molecular weight of the (A3) α-methylstyrene copolymer.

In one embodiment, the (A2) aromatic vinyl copolymer resin and the (A3) α-methylstyrene copolymer may be present in a weight ratio ((A2):(A3)) of about 5:1 to about 15:1.

In one embodiment, the (A) thermoplastic resin may include about 20 wt % to about 45 wt % of the (A1) rubber-modified aromatic vinyl graft copolymer; about 40 wt % to about 75 wt % of the (A2) aromatic vinyl copolymer resin; and about 3 wt % to about 15 wt % of the (A3) α-methylstyrene copolymer.

In one embodiment, the zinc oxide may have an average particle diameter (D50) of about 0.2 μm to about 3 μm.

In one embodiment, the zinc oxide may have a peak position (2θ) in the range of 35° to 370 in X-ray diffraction (XRD) analysis and a crystallite size of about 1,000 Å to about 2,000 Å, as calculated by Equation 2.

$$\text{Crystallite size } (D) = \frac{K\lambda}{\beta \cos\theta}, \quad \text{[Equation 2]}$$

where K is a shape factor, λ is an X-ray wavelength, β is an FWHM value (degree) of an X-ray diffraction peak, and θ is a peak position degree.

In one embodiment, the zinc oxide may have a peak intensity ratio (B/A) of about 0.01 to about 0.5, where A indicates a peak in the wavelength range of 370 nm to 390 nm and B indicates a peak in the wavelength range of 450 nm to 600 nm in measurement of photoluminescence.

In one embodiment, the (A3) α-methylstyrene copolymer and the (B) zinc oxide may be present in a weight ratio of about 1.5:1 to about 15:1.

In one embodiment, the thermoplastic resin composition may have a total volatile organic compound (TVOC) of 1,780 Area/g or less at 120° C. for 5 hours, an impact strength of about 18 kgf·cm/cm or more as measured on a ⅛" thick specimen in accordance with ASTMD256, an antibacterial activity against *Staphylococcus aureus* of about 2.0 to about 7.0 and an antibacterial activity against *Escherichia coli* of about 2.0 to about 7.5, as measured on 5 cm×5 cm specimens inoculated with *Staphylococcus aureus* and *Escherichia coli*, respectively, in accordance with JIS Z 2801 and calculated according to Equation 3.

$$\text{Antibacterial activity} = \log(M1/M2), \qquad \text{[Equation 3]}$$

where M1 is the number of bacteria as measured on a blank specimen after incubation under conditions of 35° C. and 90% RH for 24 hours, and M2 is the number of bacteria as measured on a specimen of the foam after incubation under conditions of 35° C. and 90% RH for 24 hours.

Another aspect of the present invention relates to a molded article formed of the thermoplastic resin composition as set forth above.

Advantageous Effects

The present invention provides a thermoplastic resin composition that has good balance between low odor, impact strength, creep resistance, heat resistance, fluidity and antibacterial properties, and exhibits good flame retardancy without using a separate flame retardant.

Best Mode (A) Thermoplastic Resin

The thermoplastic resin according to the present invention includes (A1) a rubber-modified aromatic vinyl graft copolymer; (A2) an aromatic vinyl copolymer resin having a melt index of about 5 g/10 min to about 8 g/10 min, as measured in accordance with ASTM D 1238; and (A3) an α-methylstyrene copolymer.

(A1) Rubber-Modified Aromatic Vinyl Graft Copolymer

The rubber-modified aromatic vinyl graft copolymer according to one embodiment of the invention may be obtained through graft copolymerization of an aromatic vinyl monomer and a monomer copolymerizable with the aromatic vinyl monomer to a rubber polymer.

In some embodiments, the rubber-modified vinyl graft copolymer may be obtained by adding the aromatic vinyl monomer and the monomer copolymerizable with the aromatic vinyl monomer to the rubber polymer, followed by polymerization, which may be carried out by any known polymerization method, such as emulsion polymerization, suspension polymerization, bulk polymerization, and the like.

In some embodiments, the rubber polymer may include diene rubbers, such as polybutadiene, poly(styrene-butadiene), and poly(acrylonitrile-butadiene); saturated rubbers obtained by adding hydrogen to the diene rubbers; isoprene rubbers; acrylic rubbers such as poly(butyl acrylate); and ethylene-propylene-diene monomer terpolymer (EPDM). These may be used alone or as a mixture thereof. For example, the rubber polymer may be diene rubbers, specifically butadiene rubbers. The rubber polymer may be present in an amount of about 5 wt % to about 65 wt %, specifically about 10 wt % to about 60 wt %, more specifically about 20 wt % to about 50 wt %, for example, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, or 50 wt %, based on 100 wt % of the rubber-modified aromatic vinyl graft copolymer. Within this range, the thermoplastic resin composition can exhibit good impact resistance and mechanical properties.

In addition, the rubber polymer (rubber particle) may have an average particle diameter (Z-average) of about 0.1 μm to about 1 μm, specifically about 0.15 m to about 0.5 μm, more specifically about 0.20 μm to about 0.35 μm, for example, 0.20 μm, 0.21 μm, 0.22 μm, 0.23 μm, 0.24 μm, 0.25 μm, 0.26 μm, 0.27 μm, 0.28 μm, 0.29 μm, 0.30 μm, 0.31 μm, 0.32 μm, 0.33 μm, 0.34 μm, or 0.35 μm. Within this range, the thermoplastic resin composition can have good properties in terms of impact resistance, external appearance, and the like.

In some embodiments, the aromatic vinyl monomer is a monomer copolymerizable with the rubber copolymer and may include, for example, styrene, α-methyl styrene, p-methyl styrene, p-t-butyl styrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 15 wt % to about 94 wt %, specifically about 20 wt % to about 80 wt %, more specifically about 30 wt % to about 60 wt %, for example, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %, based on 100 wt % of the rubber-modified aromatic vinyl graft copolymer. Within this range, the thermoplastic resin composition can exhibit good properties in terms of fatigue resistance, impact resistance, mechanical properties, and the like.

In some embodiments, the monomer copolymerizable with the aromatic vinyl monomer may include for example, a vinyl cyanide compound, such as acrylonitrile, methacrylonitrile, ethacrylonitrile, phenyl acrylonitrile, α-chloroacrylonitrile, and fumaronitrile, acrylic acid and an alky ester thereof, maleic anhydride, N-substituted maleimide, and the like. These may be used alone or as a mixture thereof. Specifically, the monomer copolymerizable with the aromatic vinyl monomer may be selected from among acrylonitrile, methyl (meth)acrylate, and combinations thereof. The monomer copolymerizable with the aromatic vinyl monomer may be present in an amount of about 1 wt % to about 50 wt %, specifically about 5 wt % to about 45 wt %, more specifically about 10 wt % to about 30 wt %, for example, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %, based on 100 wt % of the rubber-modified aromatic vinyl graft copolymer. Within this range, the thermoplastic resin composition can have good properties in terms of impact resistance, fluidity, external appearance, and the like.

In some embodiments, the rubber-modified vinyl graft copolymer may include a g-ABS copolymer obtained by grafting a styrene monomer (as an aromatic vinyl compound) and an acrylonitrile monomer (as a vinyl cyanide compound) to a butadiene-based rubber polymer and a g-MBS copolymer obtained by grafting a styrene monomer (as an aromatic vinyl compound) and methyl methacrylate (as a monomer copolymerizable with the aromatic vinyl compound) to a butadiene-based rubber polymer, without being limited thereto.

In some embodiments, the rubber-modified aromatic vinyl graft copolymer may be present in an amount of about 20 wt % to about 45 wt %, specifically about 25 wt % to about 40 wt %, for example, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, or 40 wt %, based on 100 wt % of the thermoplastic resin. Within this range, the thermoplastic resin composition can exhibit good properties in terms of impact resistance, fluidity (formability), and the like.

(A2) Aromatic Vinyl Copolymer Resin

The aromatic vinyl copolymer resin according to the present invention may have a high melt index of about 5 g/10 min to about 8 g/10 min, specifically about 5 g/10 min to about 7.5 g/10 min, for example, 5 g/10 min, 5.5 g/10 min, 6 g/10 min, 6.5 g/10 min, 7 g/10 min, or 7.5 g/10 min, as measured using a Gottfert MI-3 in accordance with ASTM D 1238. If the aromatic vinyl copolymer resin has a melt index of greater than about 8 g/10 min, the thermoplastic resin composition can suffer from deterioration in creep resistance, and if the aromatic vinyl copolymer resin has a melt index of less than about 5 g/10 min, the thermoplastic resin composition can suffer from deterioration in injection properties.

In some embodiments, the aromatic vinyl copolymer resin may be a polymer of a monomer mixture including an aromatic vinyl monomer and a monomer copolymerizable with the aromatic vinyl monomer, such as a vinyl cyanide monomer.

In some embodiments, the aromatic vinyl copolymer resin may be obtained by mixing the aromatic vinyl monomer and the monomer copolymerizable with the aromatic vinyl monomer, followed by polymerization, which may be carried out by any known polymerization method, such as emulsion polymerization, suspension polymerization, bulk polymerization, and the like.

Examples of the aromatic vinyl monomer may include styrene, α-methylstyrene, p-methyl styrene, p-t-butyl styrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 50 wt % to about 90 wt %, specifically about 65 wt % to about 85 wt %, for example, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, or 85 wt %, based on based on 100 wt % of the aromatic vinyl copolymer resin. Within this range, the thermoplastic resin composition can exhibit good properties in terms of impact resistance, fluidity, and the like.

In some embodiments, the monomer copolymerizable with the aromatic vinyl monomer may be a vinyl cyanide monomer, such as acrylonitrile, methacrylonitrile, ethacrylonitrile, phenyl acrylonitrile, α-chloroacrylonitrile, fumaronitrile, and the like. These may be used alone or as a mixture thereof. The monomer copolymerizable with the aromatic vinyl monomer may be present in an amount of about 10 wt % to about 80 wt %, specifically about 20 wt % to about 70 wt %, more specifically about 30 wt % to about 60 wt %, for example, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %, based on 100 wt % of the aromatic vinyl copolymer resin. Within this range, the thermoplastic resin composition can exhibit good properties in terms of impact resistance, fluidity, and the like.

In some embodiments, the aromatic vinyl copolymer resin may have a weight average molecular weight (Mw) of about 85,000 g/mol to about 150,000 g/mol, specifically about 90,000 g/mol to about 140,000 g/mol, for example, 90,000 g/mol, 95,000 g/mol, 100,000 g/mol, 105,000 g/mol, 110,000 g/mol, 115,000 g/mol, 120,000 g/mol, 125,000 g/mol, 130,000 g/mol, 135,000 g/mol, or 140,000 g/mol, as measured by gel permeation chromatography (GPC). Within this range, the thermoplastic resin composition can exhibit good properties in terms of mechanical strength, formability, and the like.

In some embodiments, the aromatic vinyl copolymer resin may be present in an amount of about 40 wt % to about 75 wt %, specifically about 50 wt % to about 70 wt %, for example, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, or 70 wt %, based on 100 wt % of the thermoplastic resin. Within this range, the thermoplastic resin composition can exhibit good properties in terms of impact resistance, fluidity (formability), and the like.

(A3) α-Methylstyrene Copolymer

The α-methylstyrene copolymer according to the present invention may be a polymer of a monomer mixture including α-methylstyrene and a monomer copolymerizable with α-methylstyrene.

In some embodiments, in the α-methylstyrene copolymer, α-methylstyrene may be present in an amount of about 65 wt % to about 80 wt %, for example, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, or 80 wt %, and the copolymerizable monomer may be present in an amount of about 20 wt % to about 35 wt %, for example, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, or 35 wt %. Within this range, the thermoplastic resin composition can exhibit good properties in terms of heat resistance, impact resistance, and fluidity.

The copolymerizable monomer may be a vinyl cyanide monomer, such as acrylonitrile, methacrylonitrile, ethacrylonitrile, phenyl acrylonitrile, α-chloroacrylonitrile, fumaronitrile, and the like. These may be used alone or as a mixture thereof.

In some embodiments, the α-methylstyrene copolymer may be prepared by mixing α-methylstyrene and the monomer copolymerizable therewith, followed by polymerization, which may be carried out by any well-known polymerization method, such as emulsion polymerization, suspension polymerization, bulk polymerization, and the like.

In some embodiments, the α-methylstyrene copolymer may have a weight average molecular weight (Mw) of about 130,000 g/mol to about 180,000 g/mol, specifically about 135,000 g/mol to about 160,000 g/mol, for example, 135,000 g/mol, 140,000 g/mol, 145,000 g/mol, 150,000 g/mol, 155,000 g/mol, or 160,000 g/mol, as measured by GPC. Within this range, the thermoplastic resin composition exhibits good properties in terms of mechanical strength, formability, and the like.

On the other hand, when $M_{A2}$ indicates the weight average molecular weight of the (A2) aromatic vinyl copolymer resin and $M_{A3}$ indicates the weight average molecular weight of the (A3) α-methylstyrene copolymer, the (A2) aromatic vinyl copolymer resin and the (A3) α-methylstyrene copolymer satisfy the following Relation 1.

$$M_{A2} < M_{A3},  \quad \text{[Relation 1]}$$

where $M_{A2}$ indicates the weight average molecular weight of the (A2) aromatic vinyl copolymer resin and $M_{A3}$ indicates the weight average molecular weight of the (A3) α-methylstyrene copolymer.

In addition, the (A2) aromatic vinyl copolymer resin and the (A3) α-methylstyrene copolymer may be present in a weight ratio of about 5:1 to about 15:1, for example, 5:1, 6:1, 7:1, 8:1, 9:1, 10:1, 11:1, 12:1, 13:1, 14:1, or 15:1. Within this range, the thermoplastic resin composition has good creep resistance.

In some embodiments, the α-methylstyrene copolymer may be present in an amount of about 3 wt % to about 15 wt %, specifically about 5 wt % to about 10 wt %, for example, 5 wt %, 6 wt %, 7 wt %, 8 wt %, 9 wt %, or 10 wt %, based on 100 wt % of the thermoplastic resin. Within this range, the thermoplastic resin composition can exhibit good properties in terms of impact resistance, fluidity (formability), and the like.

(B) Zinc Oxide

The zinc oxide according to the present invention has a peak intensity ratio (B/A) of about 0.01 to about 1, specifically about 0.01 to about 0.5, preferably about 0.01 to about 0.1, for example, 0.01, 0.02, 0.03, 0.04, 0.05, 0.06, 0.07, 0.08, 0.09, or 0.1, where A indicates a peak in the wavelength range of 370 nm to 390 nm and B indicates a peak in the wavelength range of 450 nm to 600 nm in photoluminescence measurement, and a BET surface area of about 10 m$^2$/g or less, specifically about 1 m$^2$/g to about 7 m$^2$/g, for example, 1 m$^2$/g, 2 m$^2$/g, 3 m$^2$/g, 4 m$^2$/g, 5 m$^2$/g, 6 m$^2$/g, or 7 m$^2$/g, as measured by a nitrogen gas adsorption method using a BET analyzer. If the peak intensity ratio (B/A) of the zinc oxide is less than about 0.01, the thermoplastic resin composition can suffer from deterioration in antibacterial properties, and if the peak intensity ratio (B/A) of the zinc oxide exceeds about 1, the thermoplastic resin composition cannot secure discoloration resistance, low odor, and creep resistance. Further, if the BET surface area of the zinc oxide exceeds about 10 m$^2$/g, the thermoplastic resin composition cannot secure low odor and creep resistance.

The zinc oxide may have an average particle diameter of about 0.2 μm to about 3 μm, specifically about 0.5 μm to about 3 μm, for example, 0.5 μm, 0.6 μm, 0.7 μm, 0.8 μm, 0.9 μm, 1 μm, 1.1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 2.6 μm. 2.7 μm, 2.8 μm, 2.9 μm, or 3 μm, as measured using a particle analyzer (LS 13 320 Particle size Analyzer, Beckman Coulter Inc.). Within this range, the thermoplastic resin composition can secure good external appearance.

The zinc oxide may have a peak position degree (2θ) in the range of about 35° to about 37° and a crystallite size of about 1,000 Å to about 2,000 Å, specifically about 1,200 Å to about 1,800 Å, for example, 1,200 Å, 1,300 Å, 1,400 Å, 1,500 Å, 1,600 Å, or 1,700 Å, in X-ray diffraction (XRD) analysis, as calculated by Equation 1. Within this range, the thermoplastic resin composition can have good properties in terms of initial color, weather resistance, antibacterial properties, and the like.

$$\text{Crystallite size } (D) = \frac{K\lambda}{\beta \cos\theta}, \quad \text{[Equation 2]}$$

where K is a shape factor, λ is an X-ray wavelength, β is an FWHM value (degree) of an X-ray diffraction peak, and θ is a peak position degree.

In some embodiments, the zinc oxide may have a purity of about 99% or more. Within this range, the thermoplastic resin composition can have further improved initial color, weather resistance, antibacterial properties, and the like.

In some embodiments, the zinc oxide may be prepared by melting metallic zinc in a reactor, heating the molten zinc to about 850° C. to about 1,000° C., specifically about 900° C. to about 950° C., to vaporize the molten zinc, injecting oxygen gas into the reactor, cooling the reactor to about 20° C. to about 30° C., heating the reactor to about 700° C. to about 800° C. for about 30 min to about 150 min while injecting nitrogen/hydrogen gas into the reactor, as needed, and cooling the reactor to room temperature (about 20° C. to about 30° C.).

In some embodiments, the zinc oxide may be present in an amount of about 0.1 parts by weight to about 10 parts by weight, specifically about 2 parts by weight to about 6 parts by weight, for example, 2 parts by weight, 3 parts by weight, 4 parts by weight, 5 parts by weight, or 6 parts by weight, relative to about 100 parts by weight of the thermoplastic resin (A). Within this range, the thermoplastic resin composition can have good properties in terms of impact resistance, flame retardancy, low odor, and antibacterial properties.

In some embodiments, the (A3) α-methylstyrene copolymer and the (B) zinc oxide may be present in a weight ratio of about 1.5:1 to about 15:1, for example, 1.5:1, 2:1, 2.5:1, 3:1, 3.5:1, 4:1, 4.5:1, 5:1, 5.5:1, 6:1, 6.5:1, 7:1, 7.5:1, 8:1, 8.5:1, 9:1, 9.5:1, 10:1, 10.5:1, 11:1, 11.5:1, 12:1, 12.5:1, 13:1, 13.5:1, 14:1, 14.5:1, or 15:1. Within this range, the thermoplastic resin composition can have good properties in terms of impact resistance, flame retardancy, low odor, and antibacterial properties.

According to one embodiment of the invention, the thermoplastic resin composition may further include additives used in typical thermoplastic resin compositions. Examples of the additives may include flame retardants, fillers, anti-oxidants, anti-dripping agents, lubricants, release agents, nucleating agents, antistatic agents, stabilizers, pigments, dyes, and mixtures thereof, without being limited thereto. The additives may be present in an amount of about 0.001 parts by weight to about 40 parts by weight, specifically about 0.1 parts by weight to about 10 parts by weight, for example, 0.1 parts by weight, 1 parts by weight, 2 parts by weight, 3 parts by weight, 4 parts by weight, 5 parts by weight, 6 parts by weight, 7 parts by weight, 8 parts by weight, 9 parts by weight, or 10 parts by weight, relative to 100 parts by weight of the thermoplastic resin.

According to one embodiment of the invention, the thermoplastic resin composition may be prepared in pellet form by mixing the aforementioned components, followed by melt extrusion using a typical twin-screw extruder at about 200° C. to about 280° C., specifically about 220° C. to about 250° C., for example, 220° C., 230° C., 240° C., or 250° C.

The thermoplastic resin composition exhibits antibacterial effect against various bacteria, such as *Staphylococcus aureus, Escherichia coli, Bacillus subtilis, Pseudomonas aeruginosa, salmonella*, pneumococcus, and Methicillin-Resistant *Staphylococcus aureus* (MRSA).

In some embodiments, the thermoplastic resin composition may have an antibacterial activity against *Staphylococcus aureus* of about 2.0 to about 7.0, specifically about 3 to about 7.0, more specifically about 4 to about 6.5, for example, 4, 4.5, 5.5, 6, or 6.5, and an antibacterial activity against *Escherichia coli* of about 2.0 to about 7.5, specifically about 4 to about 7.0, more specifically about 5 to about 6.5, for example, 5.5, 6, or 6.5, as measured on 5 cm×5 cm specimens inoculated with *Staphylococcus aureus* and *Escherichia coli*, respectively, in accordance with JIS Z 2801 and calculated according to Equation 3.

Antibacterial activity=log($M1/M2$), [Equation 3]

where M1 is the number of bacteria as measured on a blank specimen after incubation under conditions of 35° C. and 90% RH for 24 hours and M2 is the number of bacteria as measured on a specimen of the thermoplastic resin composition after incubation under conditions of 35° C. and 90% RH for 24 hours.

The thermoplastic resin composition may have an impact strength of about 18 kgf cm/cm or more, specifically about 18 kgf cm/cm to about 30 kgf cm/cm, for example, 18 kgf cm/cm, 19 kgf cm/cm, 20 kgf cm/cm, 21 kgfcm/cm, 22 kgf cm/cm, 23 kgf cm/cm, 24 kgf cm/cm, 25 kgf cm/cm, 26 kgf cm/cm, 27 kgf cm/cm, 28 kgf·cm/cm, 29 kgf·cm/cm, or 30 kgf·cm/cm, as measured on a ⅛" thick specimen in accordance with ASTMD256.

In some embodiments, the thermoplastic resin composition may have a total volatile organic compound (TVOC) of about 1780 Area/g or less, for example, about 0 to about 1775 Area/g, about 0 to about 1770 Area/g, about 0 to about 1735 Area/g, or about 0 to about 1700 Area/g, as measured by residual HS-GC at 120° C. for 5 hours.

The thermoplastic resin composition may have a creep displacement of less than about 0.89 mm, for example, about 0 to about 0.88 mm, about 0 to about 0.88 mm, about 0 to about 0.85 mm, or about 0 to about 0.82 mm, as measured under conditions of 60° C. and 150 N.

In some embodiments, the thermoplastic resin composition may have a Vicat softening temperature (VST) of about 90° C. or more, for example, about 92° C. or more, about 94° C. or more, about 95° C. or more, or about 96° C. or more, as measured on a ¼" thick specimen under a load of 5 kgf at 50° C./h in accordance with ISO 306B50. Although an upper Vicat softening temperature limit of the thermoplastic resin composition is not particularly limited, the thermoplastic resin composition may have a Vicat softening temperature (VST) of, for example, about 500° C. or less, or about 450° C. or less.

A molded article according to the present invention is produced from the thermoplastic resin composition. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles have good balance between impact strength, creep resistance, heat resistance, fluidity and antibacterial properties while exhibiting good flame retardancy without adding a separate flame retardant, and thus may be suitably applied to antibacterial products and exterior materials, for example, office equipment or household appliances, which entail frequent body contact.

Next, the present invention will be described in more detail with reference to some examples. It should be understood that these examples are provided for illustration only and are not to be in any way construed as limiting the present invention.

EXAMPLE (A) Thermoplastic Resin
(A1) Rubber-Modified Aromatic Vinyl Graft Copolymer A g-ABS copolymer obtained by grafting 55 wt % of a mixture of styrene and acrylonitrile (weight ratio: 75/25) to 45 wt % of butadiene rubber particles having a Z-average of 310 nm was used.

(A2) Aromatic Vinyl Copolymer Resin

A SAN copolymer having a melt index of 7 g/10 min as measured using a Gottfert MI-3 in accordance with ASTM D 1238 and a weight average molecular weight of 100,000 g/mol and containing 30 wt % of acrylonitrile was used.

(A3) α-Methylstyrene Copolymer

An AMS-SAN copolymer containing 30 wt % of acrylonitrile and having a weight average molecular weight of 150,000 g/mol was used.

(A4) Aromatic Vinyl Copolymer Resin

A SAN copolymer having a melt index of 2 g/10 min as measured by Gottfert MI-3 in accordance with ASTM D 1238 and a weight average molecular weight of 100,000 g/mol and containing 30 wt % of acrylonitrile was used.

(B) Zinc Oxide
Zinc oxide as listed in Table 1 was used.

TABLE 1

|  | (B1) | (B2) |
| --- | --- | --- |
| Average particle diameter (μm) | 1.0 | 1.1 |
| BET surface area (m$^2$/g) | 6 | 15 |
| Purity (%) | 99.2 | 97 |
| PL peak intensity ratio (B/A) | 0.05 | 9.8 |
| Crystallite size (Å) | 1229 | 503 |

Property Measurement of Zinc Oxide (1) Average particle diameter (unit: μm): Average particle diameter (volume average) was measured using a particle analyzer (Laser Diffraction Particle Analyzer LS 13 320, Beckman Coulter Inc.).

(2) BET surface area (unit: m$^2$/g): BET surface area was measured by a nitrogen gas adsorption method using a BET analyzer (Surface Area and Porosity Analyzer ASAP 2020, Micromeritics Inc.).

(3) Purity (unit: %): Purity was measured by thermogravimetric analysis (TGA) based on the weight of the remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak A in the wavelength range of 370 nm to 390 nm to peak B in the wavelength range of 450 nm to 600 nm was measured. Here, an injection molded specimen was irradiated with laser beams without separate treatment upon PL analysis and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used, and for more accurate analysis, the injection molded specimen was subjected to heat treatment at 600° C. in air for 2 hours to remove a polymer resin before XRD analysis.

$$\text{Crystallite size } (D) = \frac{K\lambda}{\beta \cos\theta}, \quad \text{[Equation 2]}$$

where K is a shape factor, λ is an X-ray wavelength, θ is an FWHM value (degree) of an X-ray diffraction peak, and θ is a peak position degree.

Examples 1 to 3 and Comparative Examples 1 to 5: Preparation of Thermoplastic Resin Composition The above components were placed in amounts as listed in Tables 2 and 3 and subjected to extrusion at 230° C., thereby preparing pellets. Extrusion was performed using a twin-screw extruder (L/D=36, Φ: 45 mm). The prepared pellets were dried at 80° C. for 4 hours or more and injection-molded in a 6 oz. injection molding machine (molding temperature: 250° C., mold temperature: 60° C.), thereby preparing specimens. The prepared specimens were evaluated as to the following properties by the following method, and results are shown in Table 2.

Property Evaluation (1) Antibacterial activity: Antibacterial activity was measured on 5 cm×5 cm specimens inoculated with *Staphylococcus aureus* and *Escherichia coli*, respectively, in accordance with JIS Z 2801 and calculated by Equation 3.

$$\text{Antibacterial activity} = \log(M1/M2), \quad \text{[Equation 3]}$$

where M1 is the number of bacteria as measured on a blank specimen after incubation under conditions of 35° C. and 90% RH for 24 hours and M2 is the number of bacteria as measured on a specimen of the foam after incubation under conditions of 35° C. and 90% RH for 24 hours.

(2) Impact strength (unit: kgf·cm/cm): Impact strength was measured on a ⅛" thick specimen using an INSTRON instrument in accordance with ASTMD256.

(3) Low odor (unit: Area/g): Total volatile organic compound (TVOC) was measured at 120° C. for 5 hours using HS-GC.

(4) Creep displacement (unit: mm): Displacement of a specimen was measured using a creep tester (Yonekura MFG Co., Ltd.) under conditions of 60° C. and 150 N. A lower displacement of the specimen indicates better creep resistance.

(5) Flame retardancy: Flame retardancy was measured under UL 94 5V conditions (125 mm Vertical Burning Test).

(6) Fluidity (unit: g/10 min): Melt index (MI) was measured using a Gottfert MI-3 under conditions of 200° C. and 5 kg in accordance with ASTM D1238.

(7) Heat resistance (unit: ° C.): Vicat softening temperature (VST) was measured under conditions of 5 kgf and 50° C./h on a ¼" thick specimen using in accordance with ISO 306B50.

TABLE 2

|  |  | Example 1 | Example 2 | Example 3 |
|---|---|---|---|---|
| (A) | (A1) | 26 | 26 | 26 |
|  | (A2) | 69 | 69 | 64 |
|  | (A3) | 5 | 5 | 10 |
|  | (A4) | — | — | — |
| (B) | (B1) | 2 | 3 | 2 |
| Antibacterial activity | *Staphylococcus aureus* | 4.5 | 5.8 | 5.1 |
|  | *Escherichia coli* | 3.2 | 4.0 | 3.5 |
| Impact strength (kgf · cm/cm) |  | 22 | 18 | 20 |
| Low odor (Area/g) |  | 1,771 | 1,699 | 1,732 |
| Creep resistance (mm) |  | 0.88 | 0.85 | 0.82 |
| Flame retardancy |  | V-2 | V-2 | V-2 |
| Fluidity (g/10 min) |  | 7.5 | 6.8 | 6.5 |
| VST (° C.) |  | 94.5 | 95.6 | 96.2 |

TABLE 3

|  |  | Comparative Example 1 | Comparative Example 2 | Comparative Example 3 | Comparative Example 4 | Comparative Example 5 |
|---|---|---|---|---|---|---|
| (A) | (A1) | 26 | 26 | 26 | 26 | 26 |
|  | (A2) | 69 | — | 69 | 69 | 69 |
|  | (A3) | — | 5 | 5 | 5 | 5 |
|  | (A4) | 5 | 69 | — | — | — |
| (B) | (B1) | 2 | 2 | — | 20 | 0.01 |
|  | (B2) | — | — | 2 | — | — |
| Antibacterial activity | *Staphylococcus aureus* | 5.5 | 6.2 | 5.9 | 6.8 | 1.2 |
|  | *Escherichia coli* | 3.8 | 3.9 | 4.6 | 5.7 | 0.5 |
| Impact strength (kgf · cm/cm) |  | 21 | 20 | 10 | 2 | 24 |
| Low odor (Area/g) |  | 1,781 | 1,812 | 2,008 | 1,553 | 2,195 |
| Creep resistance (mm) |  | 1.00 | 0.85 | 0.89 | 0.79 | 0.90 |
| Flame retardancy |  | V-2 | Fail | V-2 | Fail | V-2 |
| Fluidity (g/10 min) |  | 7.9 | 1.8 | 7.3 | 3.1 | 7.9 |
| VST (° C.) |  | 90.5 | 95.8 | 94.5 | 95.2 | 94.9 |

In the above results, the thermoplastic resin compositions of Examples 1 to 3 exhibited good properties in terms of low odor, impact strength, creep resistance, flame retardancy, fluidity, heat resistance, and antibacterial properties. Conversely, the thermoplastic resin composition of Comparative Example 1 prepared using a typical SAN copolymer instead of an α-methylstyrene copolymer exhibited deterioration in heat resistance and creep resistance, the thermoplastic resin composition of Comparative Example 2 prepared using a typical SAN copolymer instead of a SAN copolymer having a high melt index suffered from deterioration in fluidity and had no flame retardancy. The thermoplastic resin composition of Comparative Example 3 prepared using zinc oxide instead of zinc oxide according to the present invention exhibited antibacterial properties and suffered from deterioration in impact strength and low odor. In addition, the thermoplastic resin composition of Comparative Example 4 prepared using an excess of zinc oxide suffered from deterioration in impact strength, fluidity and flame retardancy, and the thermoplastic resin composition of Comparative Example 7 prepared using a smaller amount of zinc oxide exhibited deterioration in low odor and antibacterial properties.

It should be understood that various modifications, changes, alterations, and equivalent embodiments can be made by those skilled in the art without departing from the spirit and scope of the present invention.

The invention claimed is:

1. A thermoplastic resin composition comprising:
100 parts by weight of (A) a thermoplastic resin comprising (A1) a rubber-modified aromatic vinyl graft copolymer, (A2) an aromatic vinyl copolymer resin having a melt index (MI) of about 5 g/10 min to about 8 g/10 min, as measured in accordance with ASTM D 1238, and (A3) an α-methylstyrene copolymer; and
about 0.1 parts by weight to about 10 parts by weight of (B) zinc oxide,
wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement, a BET surface area of about 10 m²/g or less, as measured using a BET analyzer, a peak position (2θ) in the range of 35° to 37° in X-ray diffraction (XRD) analysis and a crystallite size of about 1,000 Å to about 2,000 Å, as calculated by Equation 2:

$$\text{Crystallite size } (D) = \frac{K\lambda}{\beta\cos\theta}, \qquad [\text{Equation 2}]$$

where K is a shape factor, λ is an X-ray wavelength, β is an FWHM value (degree) of an X-ray diffraction peak, and θ is a peak position degree.

2. The thermoplastic resin composition according to claim 1, wherein the (A2) aromatic vinyl copolymer resin has a weight average molecular weight of about 85,000 g/mol to about 150,000 g/mol.

3. The thermoplastic resin composition according to claim 1, wherein the (A3) α-methylstyrene copolymer is a copolymer of about 65 wt % to about 80 wt % of α-methylstyrene and about 20 wt % to about 35 wt % of acrylonitrile.

4. The thermoplastic resin composition according to claim 1, wherein the (A3) α-methylstyrene copolymer has a weight average molecular weight of about 130,000 g/mol to about 180,000 g/mol.

5. The thermoplastic resin composition according to claim 1, wherein the thermoplastic resin composition satisfies Equation 1:

$$M_{A2} < M_{A3}, \qquad [\text{Equation 1}]$$

where $M_{A2}$ is the weight average molecular weight of the (A2) aromatic vinyl copolymer resin and $M_{A3}$ is the weight average molecular weight of the (A3) α-methylstyrene copolymer.

6. The thermoplastic resin composition according to claim 1, wherein the (A2) aromatic vinyl copolymer resin and the (A3) α-methylstyrene copolymer are present in a weight ratio ((A2):(A3)) of about 5:1 to about 15:1.

7. The thermoplastic resin composition according to claim 1, wherein the (A) thermoplastic resin comprises about 20 wt % to about 45 wt % of the (A1) rubber-modified aromatic vinyl graft copolymer; about 40 wt % to about 75 wt % of the (A2) aromatic vinyl copolymer resin; and about 3 wt % to about 15 wt % of the (A3) α-methylstyrene copolymer.

8. The thermoplastic resin composition according to claim 1, wherein the zinc oxide has an average particle diameter (D50) of about 0.2 μm to about 3 μm.

9. The thermoplastic resin composition according to claim 1, wherein the zinc oxide has a peak intensity ratio (B/A) of about 0.01 to about 0.5, where A indicates a peak in the wavelength range of 370 nm to 390 nm and B indicates a peak in the wavelength range of 450 nm to 600 nm in measurement of photoluminescence.

10. The thermoplastic resin composition according to claim 1, wherein the (A3) α-methylstyrene copolymer and the (B) zinc oxide are present in a weight ratio of about 1.5:1 to about 15:1.

11. The thermoplastic resin composition according to claim 1, wherein the thermoplastic resin composition has a total volatile organic compound (TVOC) of about 1,780 Area/g or less at 120° C. for 5 hours, an impact strength of about 18 kgf·cm/cm or more, as measured on a ⅛" thick specimen in accordance with ASTMD256, and an antibacterial activity against *Staphylococcus aureus* of about 2.0 to about 7.0 and an antibacterial activity against *Escherichia coli* of about 2.0 to about 7.5, as measured on 5 cm×5 cm specimens inoculated with *Staphylococcus aureus* and *Escherichia coli*, respectively, in accordance with JIS Z 2801 and calculated according to Equation 3:

$$\text{Antibacterial activity} = \log(M1/M2), \qquad [\text{Equation 3}]$$

wherein M1 is the number of bacteria as measured on a blank specimen after incubation under conditions of 35° C. and 90% RH for 24 hours, and M2 is the number of bacteria as measured on a specimen of the thermoplastic resin composition after incubation under conditions of 35° C. and 90% RH for 24 hours.

12. A molded article produced from the thermoplastic resin composition according to claim 1.

* * * * *